United States Patent [19]

Mori et al.

[11] Patent Number: 4,728,194

[45] Date of Patent: Mar. 1, 1988

[54] METHOD OF AND APPARATUS FOR OPTICALLY MEASURING DISPLACEMENT

[75] Inventors: Sadao Mori; Toshio Akatsu; Chyuuichi Miyazaki, all of Ibaraki, Japan

[73] Assignee: Hitachi, Ltd., Tokyo, Japan

[21] Appl. No.: 919,765

[22] Filed: Oct. 16, 1986

[30] Foreign Application Priority Data

Oct. 16, 1985 [JP] Japan .................................. 60-228616

[51] Int. Cl.$^4$ .......................... G01B 11/02; G01C 3/06
[52] U.S. Cl. ..................................... 356/358; 356/4.5
[58] Field of Search ...................... 356/357, 356, 4, 4.5

[56] References Cited

U.S. PATENT DOCUMENTS 4,298,283 11/1981 Makosch et al. .................... 356/351
4,666,296 5/1987 Bailly-Salins ........................ 356/358

*Primary Examiner*—Gene Wan
*Attorney, Agent, or Firm*—Antonelli, Terry & Wands

[57] ABSTRACT

A light beam is projected on a reference plane and an object to-be-measured, a phase difference between reflected lights from them is changed by a phase shifter, a drive voltage for causing the change of the phase difference is applied to the phase shifter, a magnitude of phase shift of the phase of the reflected lights is detected by a phase shift detector on the basis of the drive voltage at a point of time at which the change of the phase difference of the reflected lights has been compensated, and an up pulse or down pulse is generated by an up-down pulse generator upon detecting a discontinuous change in the magnitude of phase shift attributed to the displacement of the object to-be-measured, while a pulse is generated by another pulse generator upon sensing a change in brightness of an interference signal of the reflected lights attributed to the displacement of the object to-be-measured. Besides, a mode selecting circuit supplies the output of the up-down pulse generator to a counter when a displacement speed of the object to-be-measured is lower than a reference speed, whereas it supplies the output of the other pulse generator to the counter when the displacement speed is higher than the reference speed. The displacement of the object to-be-measured is measured by utilizing an output of the counter.

10 Claims, 36 Drawing Figures

FIG. 2A
FIG. 2B
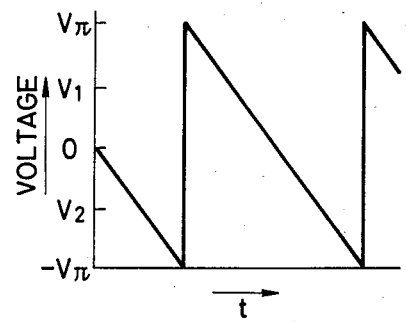
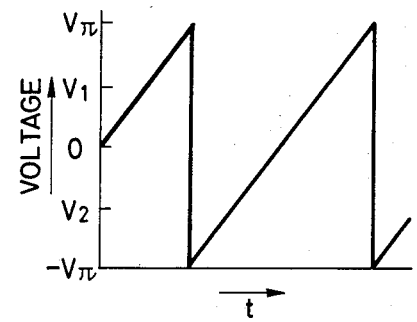
FIG. 3A
FIG. 3B
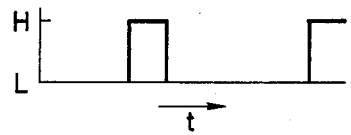
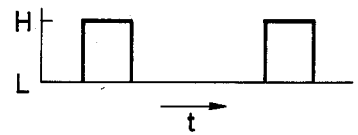
FIG. 4A
FIG. 4B
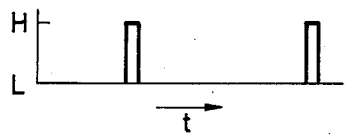
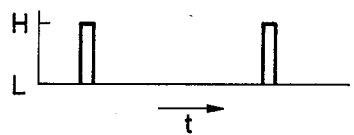
FIG. 5A
FIG. 5B
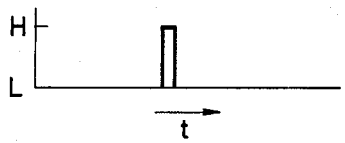
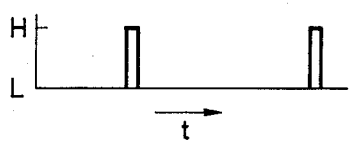

METHOD OF AND APPARATUS FOR OPTICALLY MEASURING DISPLACEMENT

BACKGROUND OF THE INVENTION

1. Field of the Invention

The present invention relates to a method of and apparatus for optically measuring a displacement which are utilized by way of example for the displacement measurement of a machine requiring accurate positioning such as a semiconductor manufacturing plant or a coordinate measuring instrument.

2. Description of the Prior Art

A method of optically measuring the displacement of an object to-be-measured is, for example, an interferometric method disclosed in the specification of U.S. Pat. No. 4,298,283. This method is such that light is projected on a reference plane and a plane to-be-measured, that the phases of resulting reflected lights are cyclically and forcibly changed by a phase shifter, and that the magnitude of the displacement of the object to-be-measured is evaluated from the magnitude of phase shift at the moment at which the phase change generated by the displacement of the object has been compensated by the phase shifter.

This method, however, cannot be used for a positioning displacement sensor because the measurement range thereof is as narrow as approximately a half of the wavelength of a light source employed. Moreover, even when the use is restricted to the measurements of minute displacements, the limited measurement range makes it necessary to adjust the phases of reflected lights with a Babinet-Soleil compensator before the measurement and to start the measurement from the middle of the measurement range. This initialization requires a long time.

SUMMARY OF THE INVENTION

An object of the present invention is to provide a method of and apparatus for optically measuring a displacement which have a wide measurement range.

Another object of the present invention is to provide a method of and apparatus for optically measuring a displacement which have a high response rate.

Another object of the present invention is to provide a method of and apparatus for optically measuring a displacement which have a high measurement accuracy.

The measuring method of the present invention is a method wherein a light beam is projected on a reference plane and an object to-be-measured, and a displacement of the object to-be-measured is measured by utilizing interference of two reflected lights from the reference plane and the object to-be-measured, comprising the step of detecting a magnitude of phase shift of a phase between the reflected lights by the use of a level of a drive signal applied to a phase shifter at a moment at which a change in the phase difference of the reflected lights generated by the displacement of the object to-be-measured has been compensated by the phase shifter, the step of generating an up pulse or a down pulse in accordance with a direction of the displacement by detecting a discontinuous change in the magnitude of phase shift attributed to the displacement of the object to-be-measured, and separately generating a pulse by sensing a change in brightness of an interference signal of the reflected lights, the step of counting the up or down pulses when a displacement speed of the object to-be-measured is lower than a predetermined speed, and counting the pulses obtained in accordance with the brightness of the interference signal when the displacement speed of the object to-be-measured is higher than the predetermined speed, and the step of measuring the displacement of the object to-be-measured by utilizing the count value.

The measuring apparatus of the present invention is an apparatus wherein a light beam is projected on a reference plane and an object to-be-measured, and a displacement of the object to-be-measured is measured by utilizing interference of resulting reflected lights from the reference plane and the object to-be-measured, comprising a phase shifter which cyclically and forcibly changes a phase difference of the reflected lights with an amplitude of at least $\pi$ radian, phase shift magnitude detecting means to detect a magnitude of phase shift of the phase of the reflected lights from a level of a drive signal applied to said phase shifter at a moment at which the change of the phase difference of the reflected lights has been compensated by said phase shifter, a first pulse generator (up-down pulse generator) which generates an up pulse or a down pulse in accordance with a direction of the displacement of the object to-be-measured upon detecting a discontinuous change in the magnitude of phase shift arising each time the phase difference of the reflected lights generated by the displacement of the object to-be-measured exceeds a fixed value, a second pulse generator which is disposed separately from said first pulse generator and which generates a pulse upon sensing a change in brightness of an interference signal of the reflected lights, a mode selecting circuit which operates on the basis of a displacement speed of the object to-be-measured to pass the output pulse of said first pulse generator when the displacement speed is lower than a predetermined speed and to pass the output pulse of said second pulse generator when the displacement speed is higher than the predetermined speed contrariwise, and a counter which counts the output pulses having passed through said mode selecting circuit, the displacement of the object to-be-measured being measured by utilizing a value of said counter.

BRIEF DESCRIPTION OF THE DRAWINGS

FIGS. 2A and 2B—FIGS. 10A and 10B are diagrams for explaining the operation of an up-down pulse generator 22 in FIG. 1, in which FIGS. 2A and 2B are output waveform diagrams of a sampling circuit 19, FIGS. 3A and 3B are output waveform diagrams of a comparator 23, FIGS. 4A and 4B are output waveform diagrams of a monostable multivibrator 25, FIGS. 5A and 5B are output waveform diagrams of a monostable multivibrator 28, FIGS. 10A and 10B are output waveform diagrams of an AND circuit 30.

DESCRIPTION OF THE PREFERRED EMBODIMENTS

Now, the present invention will be described in detail in conjunction with concrete embodiments.

Figure 1:
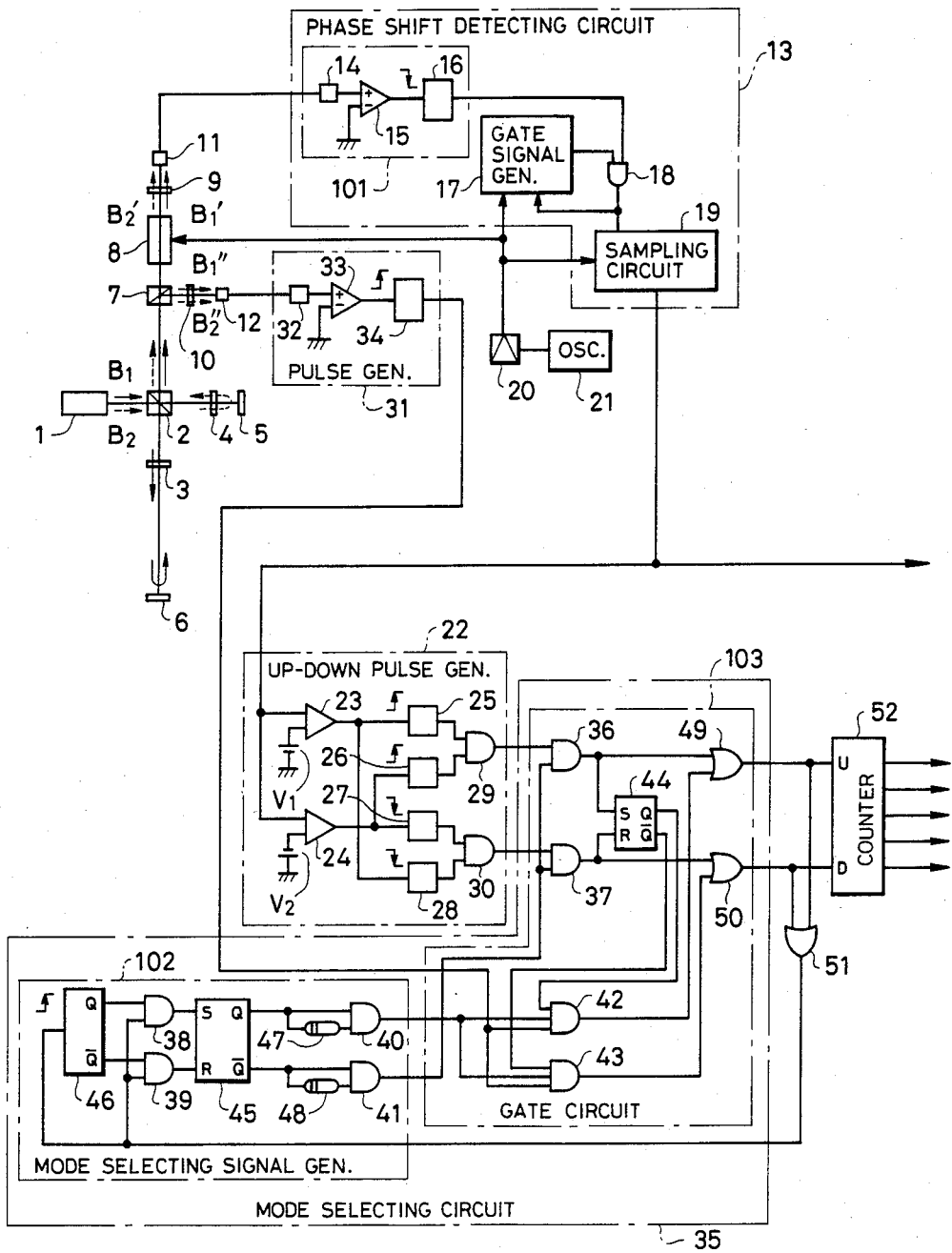
FIG. 1 is a block arrangement diagram showing an embodiment of the present invention.
Figure 6A:
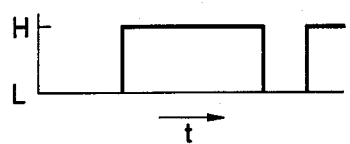
FIGS. 6A and 6B are output waveform diagrams of a comparator 24.
Figure 6B:
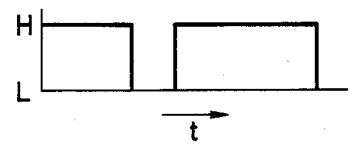
Figure 7A:
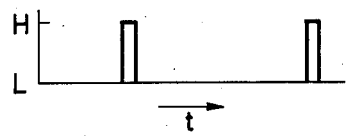
FIGS. 7A and 7B are output waveform diagrams of a monostable multivibrator 26.
Figure 7B:
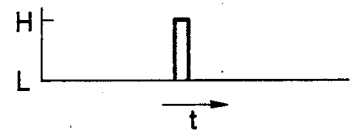
Figure 8A:
FIGS. 8A and 8B are output waveform diagrams of a monostable multivibrator 27.
Figure 8B:
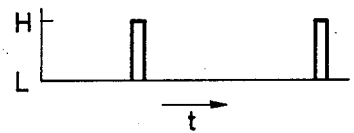
Figure 9A:
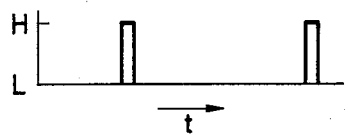
FIGS. 9A and 9B are output waveform diagrams of an AND circuit 29.
Figure 9B:
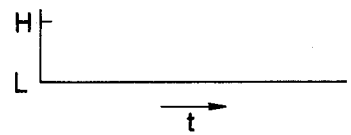
Figure 10A:
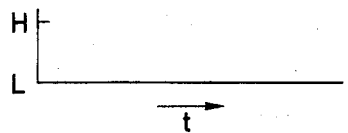
Figure 10B:
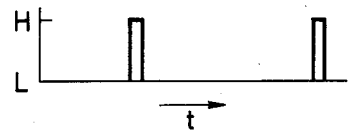

First, one embodiment of the present invention shown in FIG. 1 will be described with reference to FIGS. 1-14. In the arrangement of FIG. 1, a light source 1 emits coherent linearly-polarized light. The oscillation plane of the linear polarization is in a direction which defines an angle of 45 degrees to the sheet of the drawing. A polarizing beam splitter 2 reflects light $B_1$ of a component having an oscillation plane perpendicular to the sheet, and transmits light $B_2$ of a component having an oscillation plane parallel to the sheet. A quarter-wave ($\lambda/4$) plate 3 and an object to-be-measured 6 are arranged on the optical path of the light reflected by the polarizing beam splitter 2. A quarter-wave plate 4 and a reference plane 5 are arranged on the optical path of the light transmitted through the polarizing beam splitter 2. When the linear polarization is transmitted through the ($\lambda/4$) plate 3 or 4 twice reciprocatively, the oscillation plane rotates by 90 degrees. As a result, the reflected light reflected from the object to-be-measured 6 and passed through the ($\lambda/4$) plate 3 passes through the polarizing beam splitter 2. In addition, the reflected light reflected from the reference plane 5 and passed through the ($\lambda/4$) plate 4 is reflected by the polarizing beam splitter 2. On the optical path of the two reflected lights, there are disposed a beam splitter 7 for splitting the reflected lights, a phase shifter 8, a polarizer 9 and a photodetector 11. A polarizer 10 and a photodetector 12 are disposed on the optical path of the reflected lights split by the beam splitter 7. The phase shifter 8 is made of, for example, an electrooptic crystal having the Pockels effect. By applying a voltage to the electrooptic crystal 8, a refractive index for the light having the oscillation plane perpendicular to the sheet and a refractive index for the light having the oscillation plane parallel thereto are changed to control the phase difference between the two lights. The polarizers 9 and 10 transmit only oscillatory components defining angles of 45 degrees to the sheet. The photodetectors 11 and 12 convert into electric signals the intensities of the lights which change according to the phase difference of the reflected lights $B_1'$ and $B_2'$ and that of the reflected lights $B_1''$ and $B_2''$, respectively. A phase shift detecting circuit 13 receives the output of the photodetector 11 and the drive voltage applied to the phase shifter 8 (the output of an amplifier 20), senses from the output of the photodetector 11 the moment at which the change of the phase difference of the reflected lights generated by the displacement of the object to-be-measured 6 is compensated by the phase shifter 8, and detects the magnitude of phase shift between the reflected lights at the moment by the use of the drive voltage at this timing. The phase shift detecting circuit 13 in this example is constructed of a timing detector 101, a gate signal generator 17, an AND circuit 18 and a sampling circuit 19. Further, the timing detector 101 is constructed of a differential circuit 14, a comparator 15 and a monostable multivibrator 16. The multivibrator 16 is triggered by the falling edge of the output of the comparator 15. An oscillator 21 generates a high-frequency voltage. The high-frequency voltage is amplified by the amplifier 20, to become the drive voltage of the phase shifter 8. An up-down pulse generator 22 receives the output of the phase shift detecting circuit 13, senses the discontinuous change of the received magnitude of phase shift and generates an up pulse or a down pulse in accordance with the direction of the change. The up-down pulse generator 22 in this example is constructed of comparators 23 and 24, monostable multivibrators 25-28, and AND circuits 29 and 30. Here, the monostable multivibrators 25 and 26 are respectively triggered by the rising edges of the outputs of the comparators 23 and 24, and the outputs thereof are both applied to the AND circuit 29. In addition, the monostable multivibrators 27 and 28 are respectively triggered by the falling edges of the outputs of the comparators 24 and 23, and the outputs thereof are both applied to the AND circuit 30. A pulse generator 31 receives the output signal of the photodetector 12, senses the change of the brightness of the interference signal between the reflected lights and generates a pulse on each occasion. The pulse generator 31 in this example is constructed of a differential circuit 32, a comparator 33 and a monostable multivibrator 34. When the displacement speed of the object to-be-measured 6 is lower than a predetermined speed, a mode selecting circuit 35 allows only the output pulse of the up-down pulse generator 22 to pass therethrough and applies it to a counter 52. To the contrary, when the displacement speed is higher than the predetermined speed, the mode selecting circuit 35 allows only the output pulse of the pulse generator 31 to pass therethrough and applies it to the counter 52. The mode selecting circuit 35 is constructed of a mode selecting signal generator 102 which generates a selecting signal for a lower-speed mode or a higher-speed mode in accordance with the displacement speed, and a gate circuit 103 which selects either the output pulse of the circuit 22 or that of the circuit 31 and passes it in accordance with the output of the generator 102. The mode selecting signal generator 102 in this example is constructed of a monostable multivibrator 46 which is triggered by the rising edge of an input signal thereof, AND circuits 38 and 39, an R-S flip-flop 45, AND circuits 40 and 41, and delay elements 47 and 48. In addition, the gate circuit 103 is constructed of AND circuits 36, 37, 42 and 43, an R-S flip-flop 44, and OR circuits 49 and 50. An OR circuit 51 supplies the logical sum signal of the inputs of the counter 52 as the input of the mode selecting signal generator 102. The counter 52 counts the pulses which have passed through the mode selecting circuit 35.

Next, the operation of the embodiment of the present invention illustrated in FIG. 1 will be described. $B_1$ is let denote the component having the oscillation plane perpendicular to the sheet of the drawing in the linearly-polarized light emitted from the light source 1, and $B_2$ is let denote the component having the oscillation plane parallel to the sheet. The component $B_1$ is reflected by the polarizing beam splitter 2, is transmitted through the quarter-wave plate 3, is reflected by the object to-be-measured 6 and is led to the polarizing beam splitter via the quarter-wave plate 3 again. Since the component $B_1$ is transmitted through the quarter-wave plate 3 twice reciprocatively, the oscillation plane at this time rotates by 90 degrees and is parallel to the sheet, so that the component passes through the beam splitter 2. On the other hand, the component $B_2$ is transmitted through the polarizing beam splitter 2 and enters the polarizing beam splitter 2 via the path of the quarter-wave plate 4→the reference plane 5→the quarter-wave plate 4. Since the oscillation plane rotates by 90 degrees and is perpendicular to the sheet, the component $B_2$ is reflected by the beam splitter 2. The components $B_1$ and $B_2$ emergent from the polarizing beam splitter lead to the beam splitter 7, and are split into transmitted light and reflected light. The transmitted light and the reflected light are respectively expressed as $B_1'$, $B_2'$ and $B_1''$, $B_2''$. In this embodiment, the displacement magnitude is evaluated by utilizing the transmitted light $B_1'$, $B_2'$ when the displacement speed is lower and by utilizing the reflected light $B_1''$, $B_2''$ when the speed is higher. First, the operation in the case of the lower displacement speed will be described. The transmitted light $B_1'$, $B_2'$ leads to the polarizer 9 via the electrooptic crystal 8. Here, only those components of the lights $B_1$ and $B_2$ which have the oscillation planes of 45° with respect to the sheet pass through the polarizer 9 and give rise to interference, so that the intensity of the light changes according to the phase difference between the lights $B_1$ and $B_2$. The light intensity is converted by the photodetector 11 into the electric signal, which is applied to the phase shift detecting means 13. Meanwhile, the output voltage of the oscillator 21 is amplified by the A.C. amplifier 20 and then applied to the electrooptic crystal 8, whereby the phase difference of the components $B_1'$ and $B_2'$ is forced to fluctuate by the following $\phi_f$ of Eq. (1):

$$\phi_f = A \sin \omega t \qquad (1)$$

Here, an amplitude A is set to be somewhat greater than $\pi$. Besides, a phase difference $\phi$ which is based on the difference between an optical path length $l$ from the object to-be-measured 6 to the center of the polarizing beam splitter 2 and an optical path length $l_o$ from the reference plane 5 to the center of the polarizing beam splitter is given by Eq. (2):

$$\phi = \frac{4\pi}{\lambda}(l - l_o) \qquad (2)$$

Accordingly, the phase difference $\phi_t$ of the components $B_1'$ and $B_2'$ becomes as indicated by Eq. (3):

$$\phi_t = \phi + \phi_f$$

$$\phi = \frac{4\pi}{\lambda}(l - l_o) + A \sin \omega t \qquad (3)$$

Letting $I_1'$ and $I_2'$ denote the intensities of the respective lights $B_1'$ and $B_2'$ having passed through the polarizer 9, the intensity $I'$ of the interference light is expressed by Eq. (4):

$$I' = I_1' + I_2' + 2\sqrt{I_1' I_2'} \cos \phi_t \qquad (4)$$

This intensity of the interference light is converted into the electric signal by the photodetector 11. The electric signal is passed through the differential circuit 14 and then the pulse is generated by the monostable multivibrator 16 at the time at which the interference signal indicated by Eq. (4) becomes the maximum. The phase difference $\phi_t$ of the lights $B_1$ and $B_2$ at this time is given by Eq. (5):

$$\phi_t = 2n\pi (n = 0, \pm 1, \pm 2, \ldots) \qquad (5)$$

While $\phi_f$ indicated by Eq. (1) is caused to fluctuate in the range of $-A \leq \phi_f < A$, only the first one of the pulses generated during the increase of $\phi_f$ from $-\pi$ to $+\pi$ is selected by the gate signal generator 17 as well as the AND circuit 18. Then, the input voltage of the phase shifter 8 at that time t is sampled by the sampling circuit 19 so as to evaluate the magnitude of phase shift $\phi_f$ on that occasion.

Thus, save when the phase difference $\phi$ generated in correspondence with the displacement of the object to-be-measured 6 as expressed by Eq. (2) becomes $(2m+1)\pi$ (m: integer), pulses generated when $\phi_f$ assumes values fulfilling Eq. (6) indicated below are validated:

$$\phi' + \phi_f = 0 \qquad (6)$$

Here, $\phi'$ is defined by Eq. (7):

$$\phi = 2m\pi + \phi' \qquad (7)$$

$$|\phi'| < \pi$$

where m denotes an integer.

In addition, when $\phi$ becomes $(2m+1)\pi$, pulses generated at times fulfilling Eq. (8) are validated:

$$\phi_f = -\pi \qquad (8)$$

Figure 11:
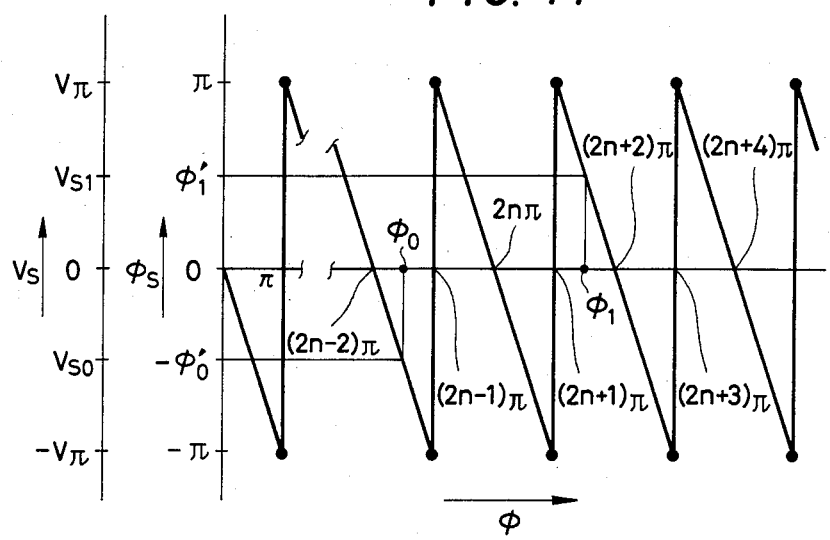
FIG. 11 is a diagram showing the relationship between a phase difference and a magnitude of phase shift and the relationship between the phase difference and a voltage applied to a phase shifter.

Accordingly, when the phase difference $\phi$ is taken on the axis of abscissas and the magnitude of phase shift $\phi_f$ at the generation of the valid pulse and the voltage $V_s$ applied to the electrooptic crystal 8 are taken on the axis of ordinates, the relationships become as shown in FIG. 11.

Let $\phi_o$ denote the phase difference of the reflected light components $B_1'$ and $B_2'$ included when the object to-be-measured 6 is first located at the position of an origin, and $\phi_o'$ denote a difference obtained by subtracting integral times of $2\pi$ from $\phi_o$. Let $V_{so}$ denote the output voltage of the sampling circuit 19 provided when the object to-be-measured 6 lies at the origin. When multiplied by $\pi/V_\pi$, this voltage $V_{so}$ becomes $-\phi_o'$ in terms of the magnitude of phase shift. It is assumed that the object to-be-measured 6 have been displaced in a plus direction from the origin and that the phase difference $\phi$ have increased from $\phi_o$ to $\phi_1$. As $\phi$ increases, $V_s$ decreases. However, when $\phi$ exceeds $(2n-1)\pi$, $V_s$ changes discontinuously from $-V_\pi$ to $V_\pi$ at that time. Here, $V_\pi$ denotes a voltage which is required for the components $B_1'$ and $B_2'$ to generate a phase difference $\pi$. When the object is further displaced, $V_s'$ decreases gradually, and when $\phi$ exceeds $(2n+1)\pi$, $V_s'$ changes from $-V_\pi$ to $V_\pi$ again. $V_{s1}$ is let denote the output voltage of the sampling circuit 19 provided when $\phi$ has increased to $\phi_1$. When multiplied by $\pi/V_\pi$, this voltage $V_{s1}$ becomes $-\phi_1'$ in terms of the magnitude of phase shift. Here, $\phi_1'$ denotes a difference obtained by subtracting integral times of $2\pi$ from $\phi_1$. Accordingly, the displacement magnitude at this time can be found in the following way:

The discontinuous change of the output voltage of the sampling circuit 19 from $-V_\pi$ to $V_\pi$ is grasped, and an up pulse is generated by the up-down pulse generator 22 and is counted in + by the counter circuit 52. Such counted result is multiplied by $\lambda/2$, and the following is added to the product:

$$\frac{\lambda}{4\pi}(\phi_1' - \phi_o') = \frac{\lambda}{4V_\pi} \times (-V_{s1} + V_{so})$$

In a case where the object to-be-measured is displaced in a minus direction, the output voltage of the sampling circuit 19 changes discontinuously from $V_\pi$ to $-V_\pi$ when the phase difference $\phi$ exceeds odd-number times of $\pi$ such as $(2n+1)\pi$, $(2n+3)\pi$, ... in the decreasing process thereof. Accordingly, the discontinuous change is counted in minus by the counter circuit 52 and the others are processed as in the case of finding the plus displacement, whereby the minus displacement can be found.

FIGS. 2A and 2B—FIGS. 10A and 10B are diagrams for explaining the operation of the up-down pulse generator 22, and a case where the object to-be-measured 6 is displaced at a constant speed is taken as an example. The operation in the case where the object to-be-measured 6 is displaced in the plus direction is illustrated in FIGS. 2A, 3A, 4A, 5A, ... and 10A, while the operation in the case where the object is displaced in the minus direction is illustrated in FIGS. 2B, 3B, 4B, 5B, ... and 10B. The reference voltage $V_1$ of the comparator 23 is set between 0 and $V_\pi$, while the reference voltage $V_2$ of the comparator 24 is set between $-V_\pi$ and 0, and the pulse width of the monostable multivibrator 25, 26, 27 and 28 is made sufficiently small in advance (refer to FIGS. 2A, 2B—FIGS. 8A, 8B). Under these conditions, in the case of the displacement of the object to-be-measured 6 in the plus direction, when the output of the sampling circuit 19 (refer to FIG. 2A) changes discontinuously from $-V_\pi$ to $V_\pi$, pulses generated by the monostable multivibrators 25 and 26 (refer to FIG. 4A and FIG. 7A) coincide in time, and hence, the AND circuit 29 delivers an up pulse (refer to FIG. 9A). In the case of the displacement of the object to-be-measured 6 in the minus direction, when the output of the sampling circuit 19 (refer to FIG. 2B) changes discontinuously from $V_\pi$ to $-V_\pi$, pulses generated by the monostable multivibrators 27 and 28 (refer to FIG. 5B and FIG. 9B) coincide, and the AND circuit 30 delivers a down pulse (refer to FIG. 10B).

Although the above description concerns the case of the constant displacement speed, the same applies to a case where the displacement speed changes.

Figure 12:
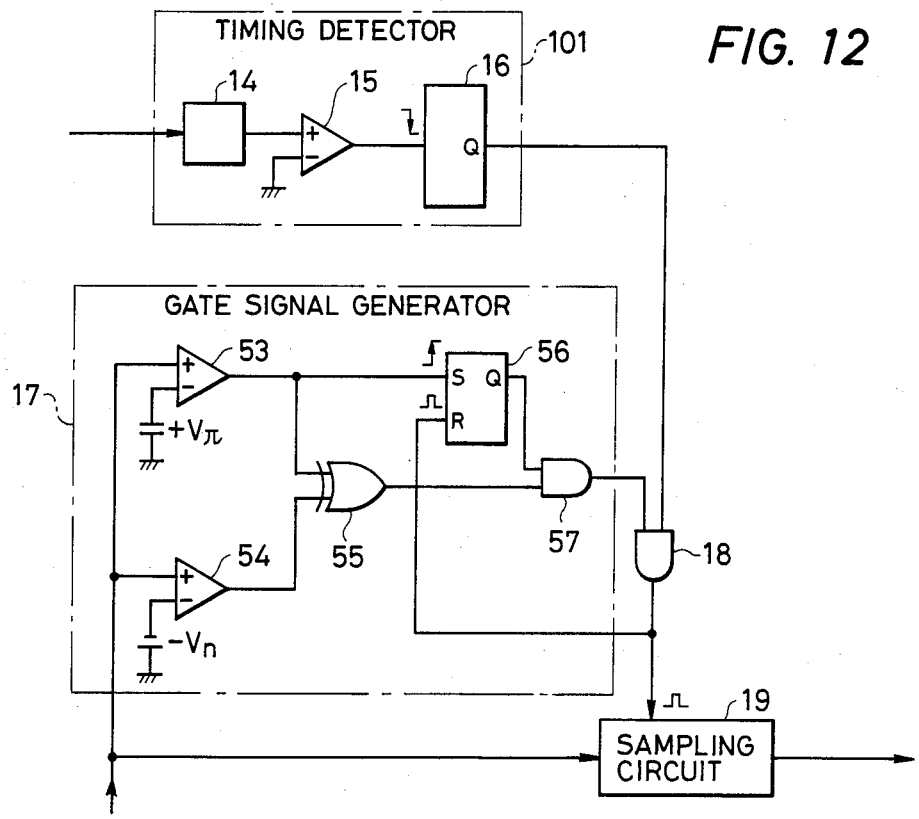
FIG. 12 is a diagram showing a practicable example of a gate signal generator 17 in FIG. 1, and FIGS. 13 and 14 are time charts showing circuit operations in the case where the displacement speed of an object to-be-measured changes.

FIG. 12 shows a practicable example of the gate signal generator 17 shown in FIG. 1. Numerals 53 and 54 indicate comparators. The reference voltage of the comparator 53 is set at $V_\pi$, and that of the comparator 54 at $-V_\pi$. The outputs of the comparators 53 and 54 are applied to an EOR circuit 55. In addition, numeral 56 indicates a D-type flip-flop which is set by the rising edge of the output of the comparator 53 and which is reset by the input pulse to the sampling circuit 19. Shown at numeral 57 is an AND circuit. According to this circuit arrangement, the gate is enabled at the moment at which the input voltage has exceeded $-V_\pi$, and it is disabled immediately after one output pulse of the monostable multivibrator 16 has passed through the AND circuit 18. It is therefore possible to select only the pulse generated at the moment at which the phase of the first reflected light components has been compensated by the electrooptic crystal 8 after the time at which the drive voltage of the electrooptical crystal 8 shown in FIG. 1 has exceeded $-V_\pi$.

Figure 13:
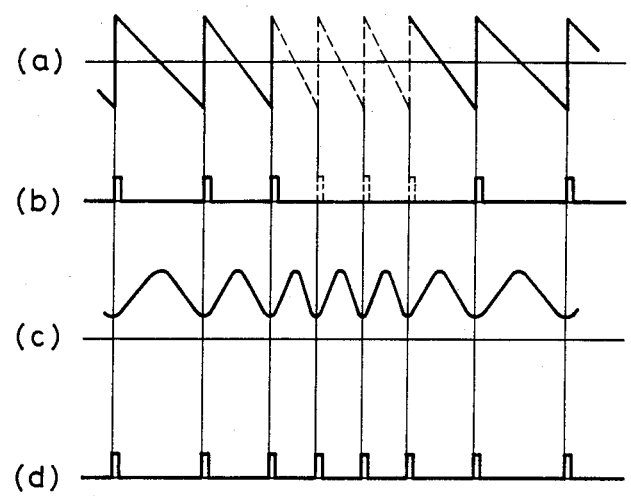

Next, operations in the case where the displacement speed of the object to-be-measured 6 is high will be described with reference to FIGS. 13 and 14. FIG. 13 shows the output (a) of the sampling circuit 19 in the process in which the object to-be-measured 6 is accelerated gradually and decelerated again, the output pulses (b) of the up-down pulse generator 22, the output voltage (c) of the photodetector 12, and the output pulses (d) of the pulse generator 31. The period of the output voltage (saw-tooth wave) of the sampling circuit 19 illustrated in FIG. 13, (a) shortens in inverse proportion to the speed of the displacement. Here, when the period of the saw-tooth wave is longer than about five times of the period of the applied voltage to the electrooptic crystal 8, the up-down pulse generator 22 operates properly. However, when the period of the saw-tooth wave becomes still shorter, the output waveform of the sampling circuit 19 comes to differ from the saw-tooth wave, and hence, the up-down pulse generator 22 might operate erroneously. (In FIG. 13, the output voltage of the sampling circuit 19 and the output pulses of the up-down pulse generator 22 in a section where the erroneous operation might occur are indicated by broken lines.)

Therefore, the mode selecting circuit 35 is used to sense the moment at which the period of the input pulses of the up-down counter 52 has become five times of that of the applied voltage to the electrooptic crystal 8, whereupon the up-down counter 52 is supplied with the output pulse of the up-down pulse generator 22 when the pulse interval is longer than the five times of the period of the applied voltage and with the output pulse of the pulse generator 31 when the pulse interval is shorter. Hereinafter, the operation of counting the output pulse of the up-down pulse generator 22 shall be termed the 'lower-speed mode,' and the operation of counting the output pulse of the pulse generator 31 the 'higher-speed mode.'

The output voltage (refer to FIG. 13, (c)) of the photodetector 12 becomes the minimum each time the object to-be-measured 6 is displaced by $\lambda/2$. In addition, the corresponding timing coincides with the moment at which the output voltage of the sampling circuit 19 (refer to FIG. 13, (a)) changes discontinuously as $-V_\pi \rightarrow V_\pi$ or $V_\pi \rightarrow -V_\pi$, namely, the moment at which the up or down pulse is generated (refer to FIG. 13, (b)) before the up-down pulse generator 22 begins to operate erroneously. Accordingly, the pulse is generated by the pulse generator 32 at this moment (refer to FIG. 13, (d)), and it is applied through the mode selecting circuit 35 to the up-down counter 52 instead of the output of the up-down pulse generator 22. Then, even when the object to-be-measured is displaced at a still higher speed, the counting is not affected. (However, the output of the sampling circuit 19 in the higher-speed mode is insignificant, and the resolving power becomes $\lambda/2$.) Meanwhile, when the displacement speed of the object to-be-measured has lowered until the period of the output (saw-tooth wave) of the sampling circuit 19 has become greater than five times of that of the applied voltage to the electrooptic crystal 8, the output pulse of the up-down pulse generator 22 is applied to the up-down counter 52 instead of the higher-speed mode pulse at that moment, whereby the operation shifts to the lower-speed mode.

Next, the operation of the mode selecting circuit 35 will be described.

Figure 14:
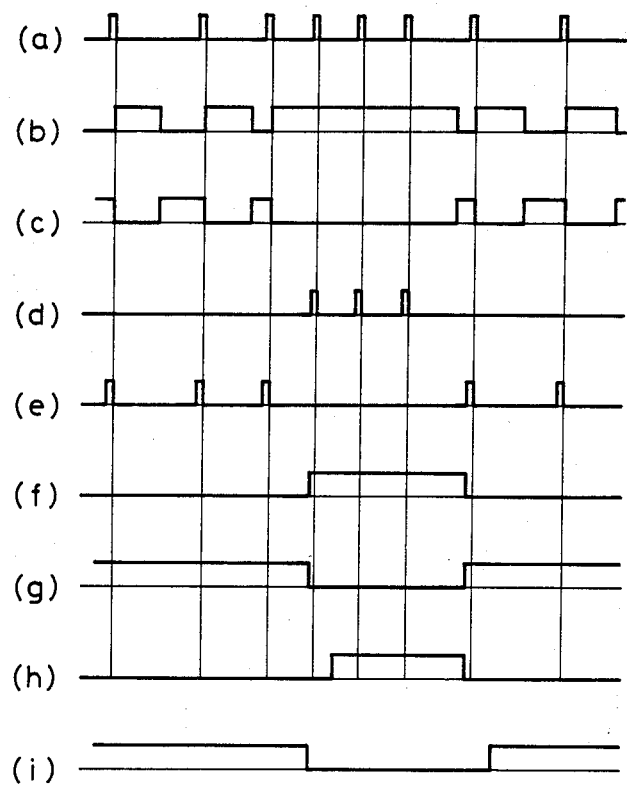

FIG. 14 (corresponding to the case illustrated in FIG. 13) shows the waveforms of various portions in the mode selecting circuit 35. (a), (b) and (c) in FIG. 14 illustrate the input, Q output and $\bar{Q}$ output of the monostable multivibrator 46 respectively, and (d) and (e) in FIG. 14 illustrate the outputs of the AND circuits 38 and 39 respectively. (f) and (g) in FIG. 14 illustrate the Q output and $\bar{Q}$ output of the R-S flip-flop 45, and (h) and (i) in FIG. 14 illustrate the outputs of the AND circuits 40 and 41, respectively. When the interval of the input pulses is longer than the output pulse width of the monostable multivibrator 46, the R-S flip-flop 45 is set, the $\bar{Q}$ output becomes 'High,' the R-S flip-flop 45 is reset through the AND circuit 39, the output of the AND circuit 41 becomes 'High,' and the output pulse of the up-down pulse generator 22 is selected by the AND circuits 36 and 37. On this occasion, since the Q output ('Low') of the flip-flop circuit 45 is supplied to the AND circuits 42 and 43 through the AND circuit 40, the output pulse of the pulse generator 31 is inhibited here. In contrast, when the interval of the input pulses becomes shorter than the output pulse width of the monostable multivibrator 46, the R-S flip-flop 45 is set, the Q and $\bar{Q}$ outputs are inverted, the output of the pulse generator 31 is selected, and the output pulse of the up-down pulse generator 22 is inhibited. On this occasion, the output of the pulse generator 31 is not distinguished as to 'up' or 'down.' Therefore, the direction of the displacement in the lower-speed mode immediately before mode switching is stored in the flip-flop 44 and is used for distinguishing the 'up' or 'down.' Moreover, the rising edges of the Q and $\bar{Q}$ outputs of the flip-flop 45 are delayed for a certain period of time by the use of the delay elements 47 and 48 and the AND circuits 40 and 41. This is intended to prevent the occurrence of miscounting which arises in such a manner that, at the moment of the mode switching, both the output pulse of the up-down pulse generator 22 and the output pulse of the higher-mode pulse generator 31 pass through the mode selecting circuit 35 and enter the up-down counter 52.

Figure 15:
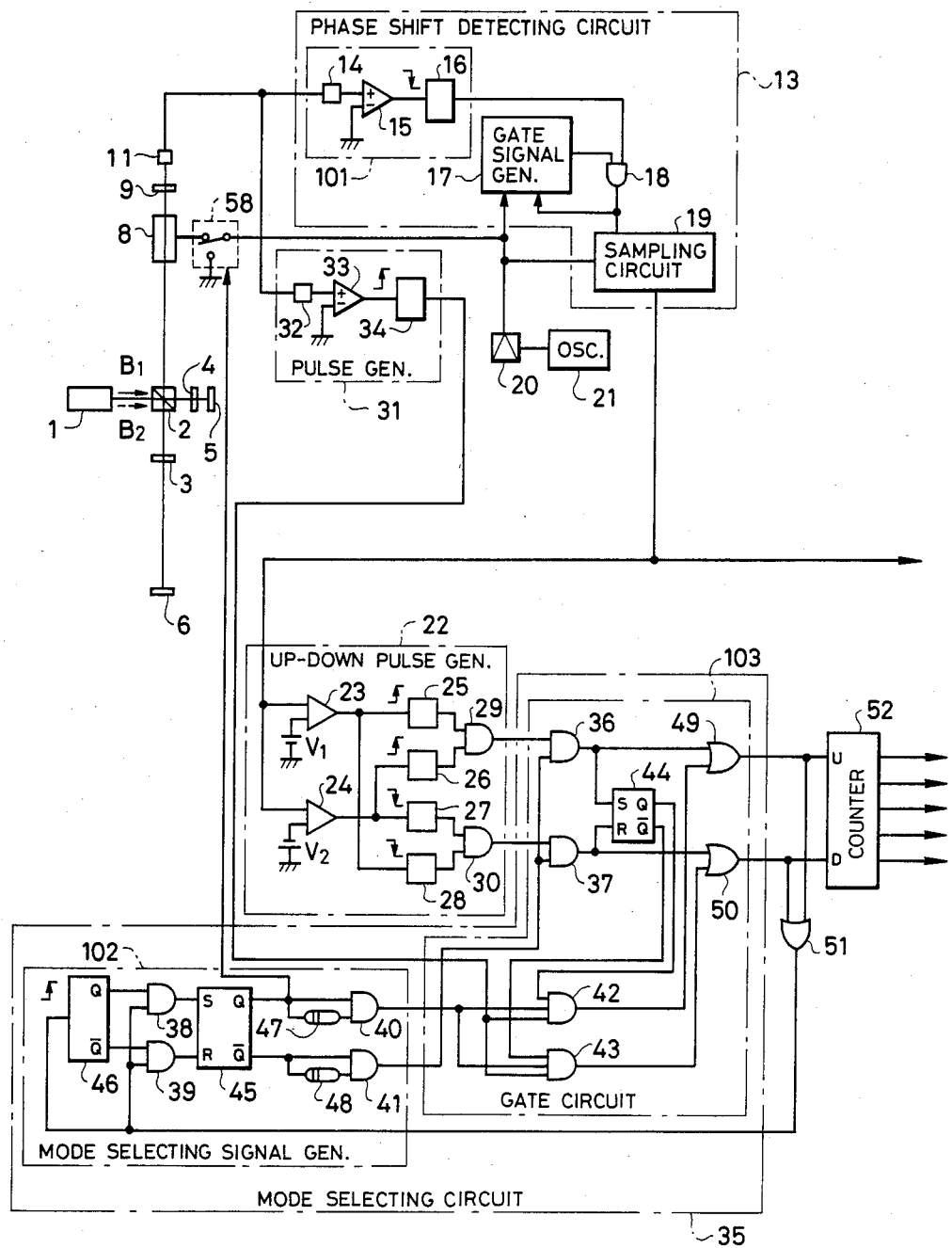
FIG. 15 is a block arrangement diagram showing another embodiment of the present invention.

FIG. 15 shows another embodiment of the present invention, in which the same symbols as in FIG. 1 denote identical constituents.

Numeral 58 designates an electronic switch as switching means which is driven by the Q output of the R-S flip-flop 45. When the displacement is of low speed (when the Q output is 'Low'), the electronic switch is set so as to connect the A.C. amplifier 20 with the electrooptic crystal 8. The operation in this state is the same as in the first embodiment. When the displacement becomes fast until the $\bar{Q}$ output of the flip-flop 45 becomes 'High,' the electronic switch 58 functions to make the applied voltage of the electrooptic crystal 8 null, so that any new phase shift is not generated between the reflected light components $B_1$ and $B_2$ by means of the electrooptic crystal 8. Accordingly, the output voltage of the photodetector 11 becomes similar to that of the photodetector 12 in the first embodiment, so that the monostable multivibrator 34 provides a higher-speed mode pulse.

Figure 16:
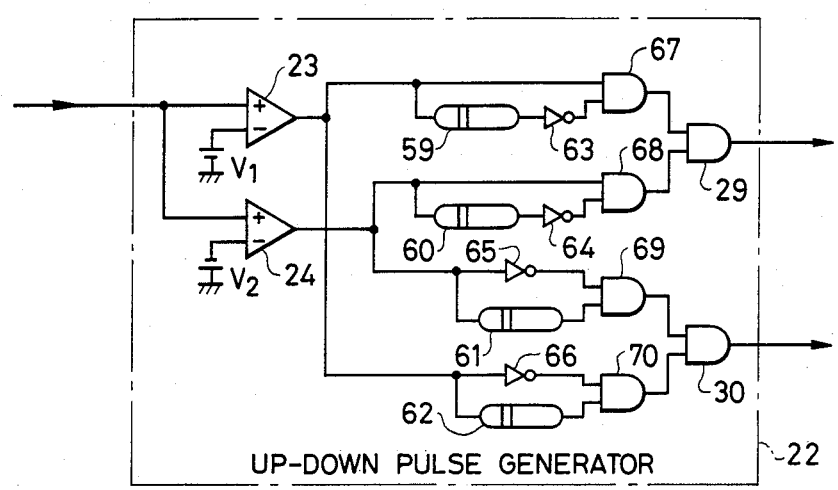
FIGS. 16 and 17 are diagrams each showing another practicable arrangement of the up-down pulse generator.

FIG. 16 shows another example of arrangement of the up-down pulse generator 22. The same symbols as in FIG. 1 denote identical constituents. Numerals 59, 60, 61 and 62 designate delay elements, numerals 63, 64, 65 and 66 inverter circuits, and numerals 67, 68, 69 and 70 AND circuits. For example, the portion which consists of the delay element 59, inverter circuit 63 and AND circuit 67 has a function equivalent to that of a monostable multivibrator which is triggered by the rising edge of its input, and the operation of the portion is stabler than that of the monostable multivibrator.

Figure 17:
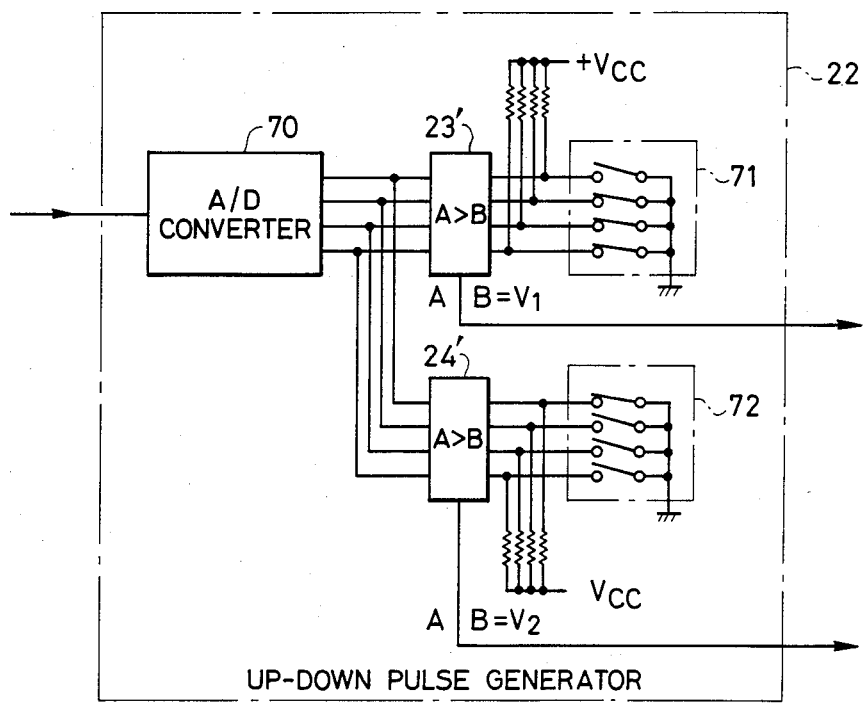

FIG. 17 shows an arrangement in which the portion of the comparators 23 and 24 of the up-down pulse generator 22 in FIG. 1 is digitized. Numeral 70 indicates an A/D converter, numerals 23' and 24' indicate digital comparators, and numerals 71 and 72 indicate switch arrays which set the reference voltages of the respective digital comparators 23' and 24'. The output of the A/D converter 70 is the digitized value of the output voltage of the sampling circuit 19. Advantageously, it can be directly utilized when the displacement magnitude is evaluated by calculating and combining the fraction component of the phase difference in the first embodiment (the output voltage of the sampling circuit 19) and the counted result obtained with reference to the phase difference ($\pi/2$) (the output of the up-down counter 52).

Figure 18A:
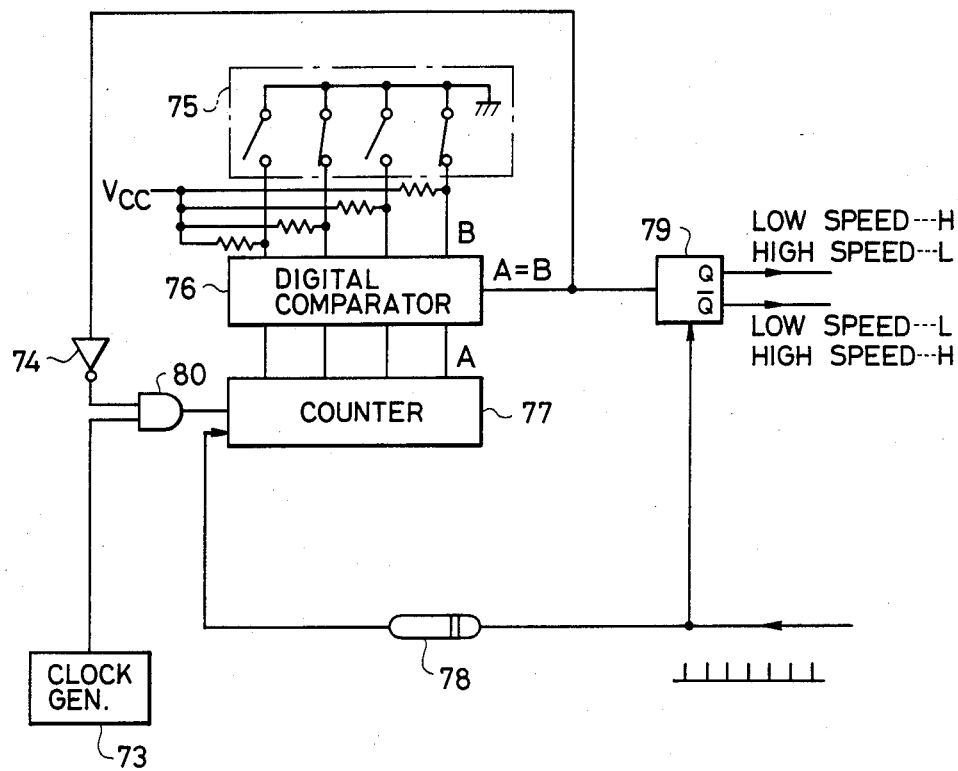
FIGS. 18A and 18B are diagrams each showing a practicable arrangement of a mode selecting signal generator.

FIG. 18A shows another example of arrangement of the mode selecting signal generator 102 of the mode selecting circuit 35 in FIG. 1. Numeral 73 indicates a clock generator, numeral 74 an inverter circuit, numeral 75 a switch array, numeral 76 a digital comparator, numeral 77 a counter, numeral 78 a delay element, numeral 79 a latch circuit, and numeral 80 an AND circuit. The counter 77 is reset by an input pulse to the mode selecting circuit, and begins to count clock signals at the moment. Here, when the counted result of the counter 77 and the set value of the switch array 75 have equalized before the entry of the next pulse, two outputs of the comparator 77 become 'High,' and a 'Low' output is supplied to the AND circuit 80 through the inverter circuit 74, so that the counted result does not increase any more. In a case where the counted result is less than the set value of the switch array 75, the (A=B) output is low. Accordingly, when the interval of the input pulses is longer than (clock frequency)×(set value of the switch array), the high level is delivered to the latch circuit 79, and when the interval is shorter, the low level is delivered. When the mode selecting signal generator is digitized, there is the advantage that the pulse interval for switching the modes can be set readily and precisely.

Figure 18B:
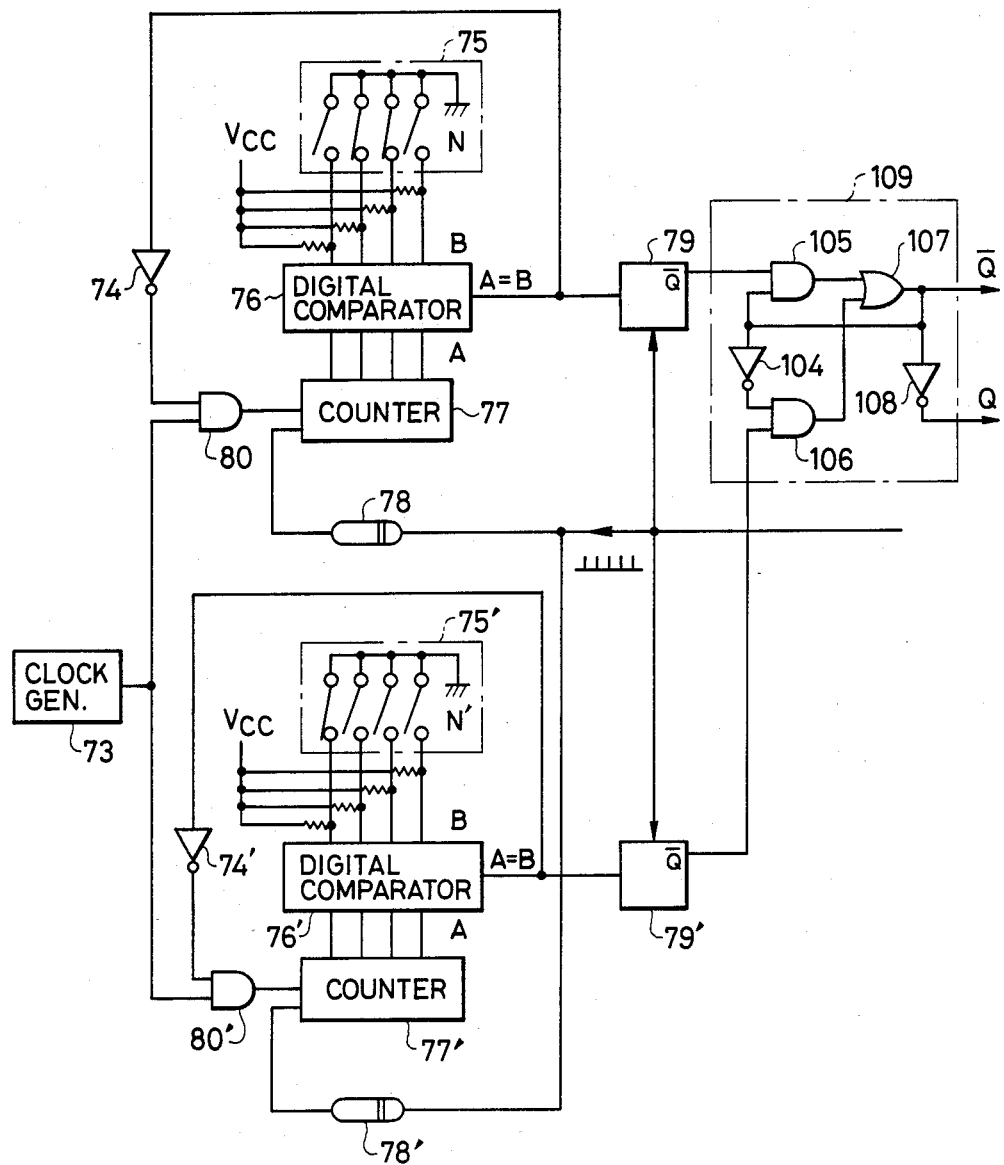

FIG. 18B shows another practicable arrangement of the mode selecting circuit 35. In FIG. 18B, the same numerals as in FIG. 18A designate identical constituents, and dashed numerals designate similar constituents. A hysteresis circuit 109 is constructed of inverters 104 and 108, AND circuits 105 and 106, and an OR circuit 107. It makes a mode switching reference value different between cases where the displacement speed of the object to-be-measured increases and decreases, and endows the reference value with a hysteresis characteristic. The set values of switch arrays 75 and 75' are respectively denoted by N and N', and N'>N is held. Thus, flip-flops 79 and 79' have their outputs changed with boundaries at velocities v and v' which are respectively determined by N and N'. When the displacement speed is sufficiently low, the hysteresis circuit 109 selects and delivers the output of the flip-flop 79. However, when the displacement speed has increased above v, the $\overline{Q}$ output of the flip-flop 79 changes from the "L" (low) level to the "H" (high) level, and hence, the hysteresis circuit 109 selects the $\overline{Q}$ output of the flip-flop 79'. When the displacement speed lowers from a sufficiently high state, the output of the flip-flop 79' does not change as long as the speed is higher than v'. However, at the moment at which the speed has lowered down to v', the output of the flip-flop 79' changes from the "H" level to the "L" level. As a result, the hysteresis circuit 109 selects the $\overline{Q}$ output of the flip-flop 79 again. Since v>v' is held, the mode switching references for the accelerating direction and the decelerating direction have the hysteresis characteristic. Thus, even when the displacement speed of the object to-be-measured is approximately equal to the reference speed for the mode switching, the modes are not frequently switched and the operation is stabilized.

Figure 19:
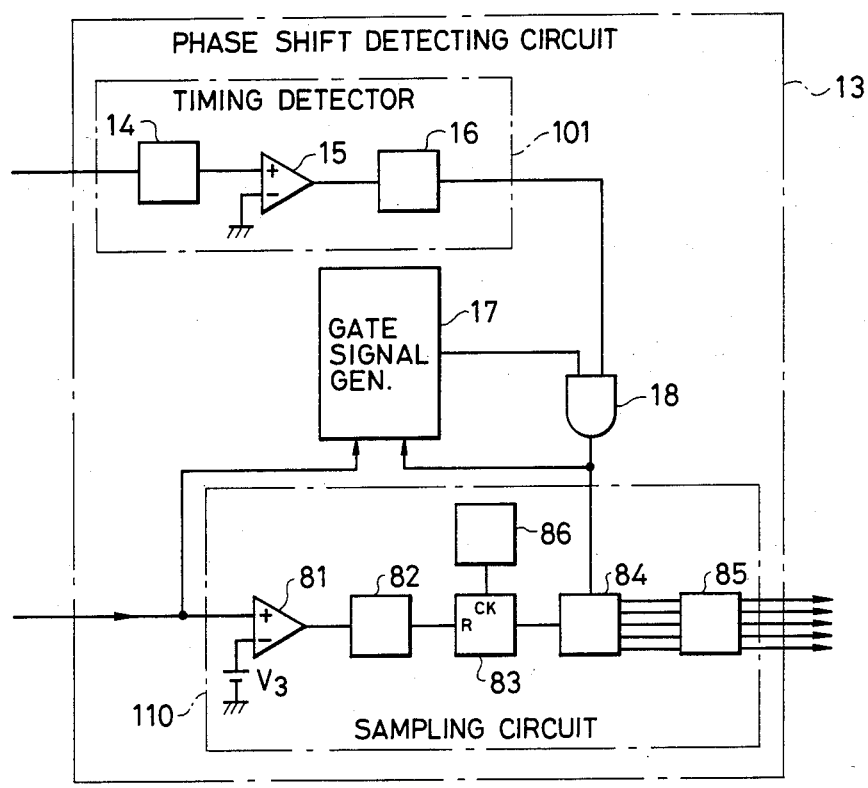
FIG. 19 is a diagram showing a practicable arrangement of a phase shift detecting circuit.

FIG. 19 shows another example of arrangement of the phase shift detecting means 13 in FIG. 1. The same symbols as in FIG. 1 denote identical constituents. Numeral 81 designates a comparator, numeral 82 a monostable multivibrator, numeral 83 a counter circuit, numeral 84 a latch circuit, numeral 85 a ROM, and numeral 86 a clock generator. The moment at which the applied voltage to the electrooptic crystal 8 has exceeded $V_s$ is detected by the comparator 81, a pulse of short duration is generated by the monostable multivibrator 82, and the counter 83 is thus reset and immediately starts counting again. The pulse generated by the monostable multivibrator 16 at the moment at which the phase of the reflected light components has been compensated, passes through the AND circuit 18 and actuates the latch circuit 84. The counted result at the time of the phase compensation is led to the address inputs of the ROM 85 through the latch circuit 84. The period of time required from the moment of the start of the counting till the actuation of the latch is evaluated from the counted result. Therefore, when the relationship of the magnitude of phase shift with the period of time elapsed since the start of the counting is calibrated and stored in the ROM beforehand, the magnitude of phase shift at the moment at which the phase of the reflected light components has been compensated can be known from the output of the ROM 85.

Figure 20:
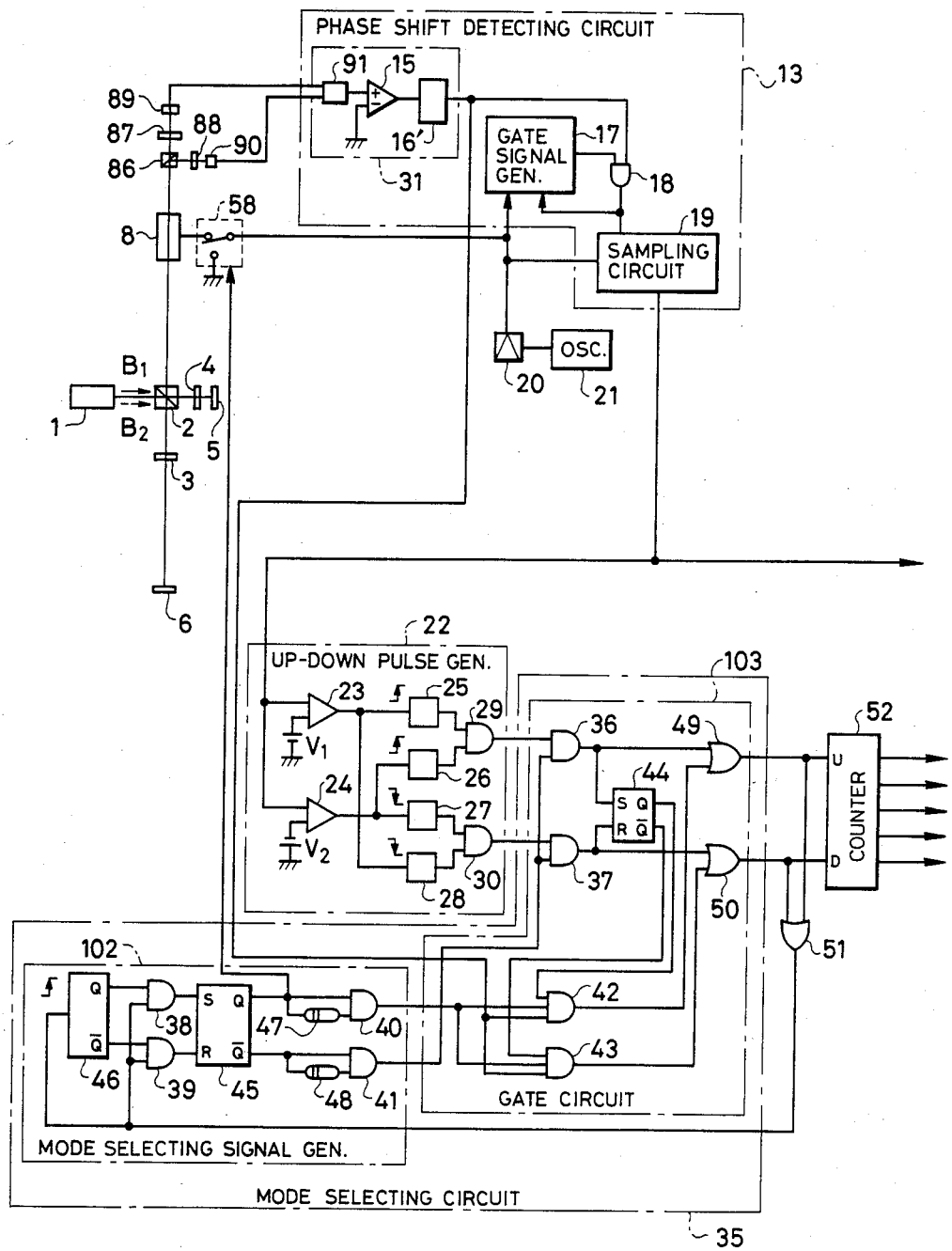
FIG. 20 is a block arrangement diagram showing another embodiment of the present invention.

FIG. 20 shows still another embodiment of the present invention.

In FIG. 20, the same numerals as in FIG. 1 indicate identical constituents. Numeral 86 designates a beam splitter. Numerals 87 and 88 designate polarizers, and the transmitting axis of the polarizer 87 defines an angle of 45° to the sheet of paper, while that of the polarizer 88 defines an angle of −45°. Numerals 89 and 90 designate photodetectors, and numeral 91 designates a differential amplifier. Shown at numeral 16' is a rising edge-/falling edge detector circuit, which generates pulses upon detecting both the rising edge and falling edge of the output of the comparator 15. The gate signal generator 17 functions, in cooperation with the AND circuit 18, to pass the first one of pulses generated by the rising edge/falling edge detector circuit 16' while the applied voltage of the electrooptic crystal 8 increases from $-V_{(\pi/2)}$ to $V_{(\pi/2)}$. Here, $V_{(\pi/2)}$ represents a voltage required for generating the phase difference of $(\pi/2)$ by means of the phase shifter 8.

In this embodiment, the pulse generator 31 enclosed with a two-dot chain line functions also as the timing circuit 101. It is constructed of the differential amplifier 91, comparator 15 and rising edge/falling edge detector 16', and it forms part of the phase shift detecting means 13.

Next, the operation of the embodiment in FIG. 20 will be described. The light $B_1$ (having the oscillation plane perpendicular to the sheet of paper) reflected from the object to-be-measured 6 and the light $B_2$ (having the oscillation plane parallel to the sheet of paper) reflected from the reference plane 5 via the same paths as in the embodiment of FIG. 1 lead to the beam splitter 86, and are split into reflected light and transmitted light here. The components of the reflected light are denoted by $B_1'$ and $B_2'$, and those of the transmitted light by $B_1''$ and $B_2''$. The reflected light components $B_1'$ and $B_2'$ are transmitted through the polarizer 88 to give rise to interference. The intensity of the resulting light is denoted by $I_1$. In addition, the transmitted light components $B_1''$ and $B_2''$ are transmitted through the polarizer 87 to give rise to interference.

Figure 21:
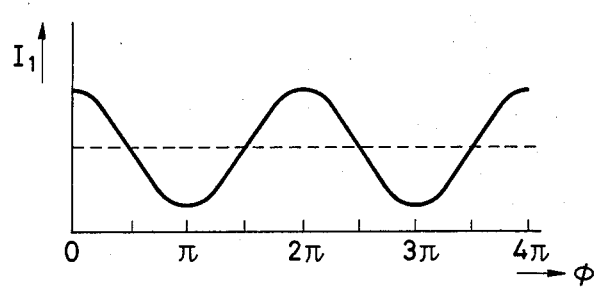
FIGS. 21-24 are diagrams for explaining operations in FIG. 20, and FIGS. 25 and 26 are diagrams each showing a practicable arrangement of a rising edge/falling edge detector circuit.
Figure 22:
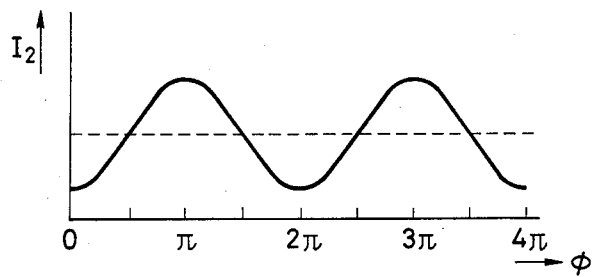
Figure 23:
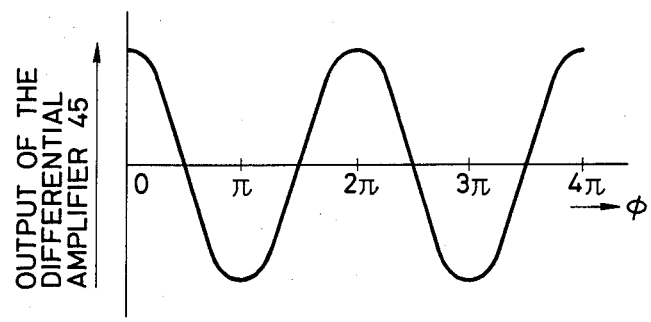

The intensity of the resulting light is denoted by $I_2$. Here, since the directions of the transmitting axes of the polarizers 87 and 88 are different, the phases of the intensity changes relative to the phase differences of the reflected light components shift by 180° though the average values of the intensities $I_1$ and $I_2$ are equal. FIG. 21 and FIG. 22 illustrate the circumstances, in which the phase difference $\phi$ is taken on the axes of abscissas and the respective light intensities $I_1$ and $I_2$ are taken on the axes of abscissas. Thus, when the interference light intensities are converted by the photodetectors into electric signals the difference of which is found by the differential amplifier, the resulting output $e_s$ changes as shown in FIG. 23. Accordingly, when $\phi_t$ in Eq. (3) mentioned before fulfills Eq. (9), the output of the differential amplifier 91 becomes null:

$$\phi_t = \phi + \phi_f \qquad (9)$$
$$= n\pi + \frac{\pi}{2}$$

where n denotes an integer.

That is, the following equation (10) holds on the basis of Eq. (3) and Eq. (9):

$$(4\pi/\lambda)(l-l_o)+A \sin \omega t = n\pi+(\pi/2) \qquad (10)$$

Figure 24:
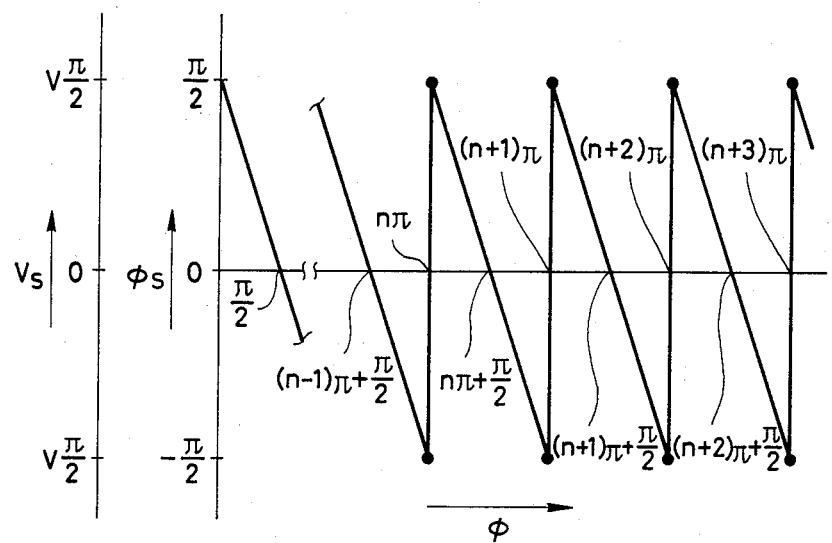

Here, the amplitude A of the phase $\phi_f$ which is caused to fluctuate by the electrooptic crystal 8 is set at or above $(\pi/2)$. On this occasion, $\phi_f$ fluctuates within a range of $-\leq\phi_f\leq A$. When Eq. (9) is met, the output of the differential amplifier 91 traverses zero. Therefore, the output of the comparator 15 changes from 'high' to 'low' or from 'low' to 'high,' and the rising edge/falling edge detector circuit 16' generates the pulse. Only the pulse generated first while the magnitude of phase shift $\phi_f$ of the electrooptic crystal 8 lies within the range of $-\pi/2$ to $\pi/2$ is selected by the gate signal generator 17 and the AND circuit 18, and the applied voltage to the electrooptic crystal 8 at the time is sampled by the sampling circuit 19 so as to find the corresponding magnitude of phase shift $\phi_s$. Herein, the relationship between the phase difference $\phi$ of the reflected light components B₁ and B₂ and the output voltage of the sampling circuit 19, namely, the applied voltage $V_s$ to the phase shifter 8 becomes as shown in FIG. 24. Accordingly, the displacement magnitude can be evaluated in the following way:

The discontinuous changes of the output voltage of the sampling circuit 19, each of which appears every ($\pi/4$) displacement of the object to-be-measured 6, are counted by the counter 52. Then, the counted result is multiplied by ($\pi/4$), and $$\frac{\lambda}{8\, V\frac{\pi}{2}} (-V_{sl} + V_{so})$$

is added to the product. Here, $V_{so}$ and $V_{sl}$ denote the output voltages of the sampling circuit 19 provided when the object to-be-measured 6 lie at the original position and the final position, respectively.

Figure 25:
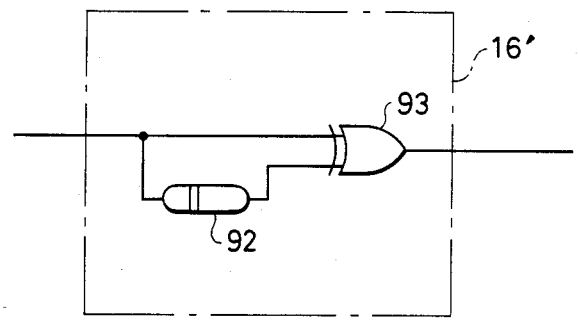
Figure 26:
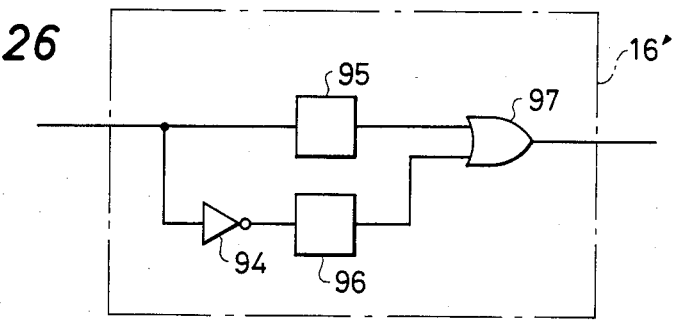

FIG. 25 shows an example of arrangement of the rising edge/falling edge detector circuit 16', which comprises a delay element 92 and an EOR circuit 93. FIG. 26 shows another example of arrangement of the rising edge/falling edge detector circuit 16', which comprises an inverter circuit 94, monostable multivibrators 95 and 96 and an OR circuit 97.

As understood from the above description, the apparatus for measuring a displacement according to the present invention measures the displacement at high precision when the moving speed of an object to-be-measured is low, and it enhances the response rate with the resolving power somewhat sacrificed when the moving speed is high, whereby both the high response rate and the high measurement accuracy can be attained, which is very advantageous as the displacement measuring apparatus for positioning.

What is claimed is:

1. In an apparatus for optically measuring a displacement wherein a light beam from a light source is projected on a reference plane and an object to-be-measured, and the displacement of the object to-be-measured is measured by utilizing interference of reflected lights from the reference plane and the object to-be-measured; an apparatus for optically measuring a displacement characterized by comprising a phase shifter which cyclically and forcibly changes a phase difference of the reflected lights with an amplitude of at least $\pi$ radian, phase shift detecting means to detect a magnitude of phase shift of the phase of the reflected lights from a level of a drive signal applied to said phase shifter at a moment at which the change of the phase difference of the reflected lights generated by the displacement of the object to-be-measured has been compensated by said phase shifter, an up-down pulse generator which generates an up pulse or a down pulse in accordance with a direction of the displacement of the object to-be-measured upon detecting a discontinuous change in the magnitude of phase shift arising each time the phase difference of the reflected lights generated by the displacement exceeds a fixed value, a pulse generator which generates a pulse upon sensing a change in brightness of an interference signal of the reflected lights, a mode selecting circuit which selects the output pulse of said up-down pulse generator when a displacement speed of the object to-be-measured is low and which selects the output pulse of said pulse generator when the speed is high, and a counter which counts the output pulses selected by said mode selecting circuit, whereby when the displacement speed of the object to-be-measured is low, an output value of said phase shift detecting means and an output value of said counter are added to find the displacement of the object to-be-measured, and when the displacement speed is high, the displacement of the object to-be-measured is found from the output value of said counter.

2. An apparatus for optically measuring a displacement as defined in claim 1, wherein said phase shift detecting means comprises a timing detector which detects a timing of the moment of the compensation of the phase of the reflected lights by said phase shifter, a gate signal generator which generates a gate signal once in one cycle from among a plurality of such timings arising while the drive signals are within a fixed range, an AND circuit which receives the output of said timing detector and the output of said gate signal generator and delivers a signal when an AND condition thereof has held, and a sampling circuit which provides as the magnitude of phase shift the drive signal applied to said phase shifter at a time of the delivery of the output of said AND circuit.

3. An apparatus for optically measuring a displacement as defined in claim 2, wherein said pulse generator is operated by utilizing the interference signal which is produced in such a way that parts of the reflected lights derived by reflected light branching means disposed in front of said phase shifter are caused to interfere.

4. An apparatus for optically measuring a displacement as defined in claim 2, wherein said pulse generator utilizes the output of said timing detector.

5. An apparatus for optically measuring a displacement as defined in claim 2, wherein said mode selecting circuit comprises a mode selecting signal generator which generates a mode selecting signal for selecting a lower-speed mode when the displacement speed of the object to-be-measured is lower than a predetermined speed and for selecting a higher-speed mode when the displacement speed is higher than the predetermined speed, and a gate circuit which passes the output pulse of said up-down pulse generator to said counter when the mode selecting signal is of the lower-speed mode and which passes the output pulse of said pulse generator to said counter when the mode selecting signal is of the higher-speed mode.

6. An apparatus for optically measuring a displacement as defined in claim 5, wherein said mode selecting signal generator comprises a retriggerable monostable multivibrator and a flip-flop circuit, and it generates the mode selecting signal by comparing magnitudes of an input pulse interval and an output pulse width of said retriggerable monostable multivibrator.

7. An apparatus for optically measuring a displacement as defined in claim 5, wherein said mode selecting signal generator comprises a clock pulse generator, a counter circuit, a digital comparator, and a latch circuit which changes the mode selecting signal in synchronism with an input pulse, and wherein said counter circuit is reset by the input pulse and then begins to count clock pulses, and the mode selecting signal is generated by comparing a counted result at a moment at which the next input pulse has entered, with a certain fixed value.

8. An apparatus for optically measuring a displacement as defined in claim 5, wherein said mode selecting circuit has a delay element which delays a rising edge or/and a falling edge of the mode selecting signal for a fixed time interval.

9. An apparatus for optically measuring a displacement as defined in claim 5, comprising switching means inserted in a drive signal path of said phase shifter to switch the drive signal, said switching means holding the drive signal of said phase shifter constant when the displacement speed of the object to-be-measured is higher on the basis of the mode selecting signal and changing the drive signal cyclically when the displacement speed is lower.

10. In a method of optically measuring a displacement wherein a light beam from a light source is projected on a reference plane and an object to-be-measured, and the displacement of the object to-be-measured is measured by utilizing interference of reflected lights from the reference plane and the object to-be-measured; a method of optically measuring a displacement comprising the step of cyclically and forcibly changing a phase difference of the reflected lights with an amplitude of at least $\pi$ radian by means of a phase shifter, the step of detecting a magnitude of phase shift of the phase of the reflected lights by utilizing a level of a drive signal applied to said phase shifter at a moment at which a change in the phase difference of the reflected lights generated by the displacement of the object to-be-measured is compensated by said phase shifter, the step of generating an up pulse or a down pulse in accordance with a direction of the displacement by detecting a discontinuous change in the magnitude of phase shift developed each time the phase difference of the reflected lights generated by the displacement of the object to-be-measured exceeds a fixed value, and generating a pulse by sensing a change in brightness of an interference signal of the reflected lights, the step of counting the up or down pulses when a displacement speed of the object to-be-measured is low, and counting the pulses obtained from the changes of the brightness of the interference signal when the displacement speed is high, and the step of measuring the displacement of the object to-be-measured by utilizing the counted value.

* * * * *